(12) United States Patent
Brower et al.

(10) Patent No.: US 11,177,694 B2
(45) Date of Patent: Nov. 16, 2021

(54) INDUCTIVE POWER TRANSFER

(71) Applicant: Hubbell Incorporated, Shelton, CT (US)

(72) Inventors: John Brower, Fairfield, CT (US); Matthew Samojeden, Rye, NY (US); Shadi AbuGhazaleh, Guilford, CT (US); Robert Simon, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/811,667

(22) Filed: Mar. 6, 2020

(65) Prior Publication Data

US 2020/0287415 A1    Sep. 10, 2020

Related U.S. Application Data

(60) Provisional application No. 62/815,128, filed on Mar. 7, 2019.

(51) Int. Cl.
*H02J 7/00* (2006.01)
*H02J 50/10* (2016.01)
*H02J 50/12* (2016.01)
*H02J 50/40* (2016.01)
*H02J 50/80* (2016.01)
*H02J 50/90* (2016.01)
(Continued)

(52) U.S. Cl.
CPC ............... *H02J 50/10* (2016.02); *H02J 7/02* (2013.01); *H02J 50/005* (2020.01); *H02J 50/40* (2016.02); *H02J 50/80* (2016.02)

(58) Field of Classification Search
None
See application file for complete search history.

(56) References Cited

U.S. PATENT DOCUMENTS 8,184,454 B2 *  5/2012  Mao .................... H02J 50/70
                                                 361/818
8,369,905 B2 *  2/2013  Sogabe ............... H04B 5/0093
                                                 455/573

(Continued)

OTHER PUBLICATIONS

PCT/US2020/021462 International Search Report and Written Opinion dated Jun. 3, 2020 (21 pages).

*Primary Examiner* — Kenneth B Wells
(74) *Attorney, Agent, or Firm* — Michael Best & Friedrich LLP

(57) ABSTRACT

One embodiment provides a non-contact power transmitter device including a sealed housing provided at least partially within a surface, and a transmitter coil within the sealed housing configured to inductively transfer power to a power receiver device. The power transmitter device also includes a transmitter control unit coupled to the transmitter coil, a transceiver configured to communicate with the power receiver device, and an electronic processor coupled to the transmitter control unit and the transceiver. The electronic processor is configured to establish, using the transceiver, communication with the power receiver device, and negotiate power transfer requirements between the power transmitter device and the power receiver device. The electronic processor is also configured to control the transmitter coil unit to transfer power to the power receiver device.

18 Claims, 11 Drawing Sheets

(51) Int. Cl.
*H02J 7/02* (2016.01)
*H02J 50/00* (2016.01)

(56) References Cited

U.S. PATENT DOCUMENTS

| | | | | |
|---|---|---|---|---|
| 8,766,484 | B2* | 7/2014 | Baarman | H01F 38/14 |
| | | | | 307/104 |
| 8,766,487 | B2* | 7/2014 | Dibben | H02J 50/60 |
| | | | | 307/104 |
| 9,866,033 | B2* | 1/2018 | Yamamoto | H02J 7/025 |
| 10,056,946 | B2* | 8/2018 | Lee | H04B 5/0031 |
| 10,135,304 | B2* | 11/2018 | Jung | H02J 50/12 |
| 10,404,101 | B2* | 9/2019 | Sugiyama | H02J 7/025 |
| 10,454,307 | B2* | 10/2019 | Eckerson | H02J 7/025 |
| 10,523,063 | B2* | 12/2019 | Qiu | H02J 7/00045 |
| 10,547,207 | B2* | 1/2020 | Wang | H02J 50/10 |
| 10,658,872 | B2* | 5/2020 | Jung | H02J 50/90 |
| 10,734,840 | B2* | 8/2020 | Qiu | H02J 50/40 |
| 10,784,719 | B2* | 9/2020 | Yang | H02J 50/10 |
| 10,854,378 | B2* | 12/2020 | Teggatz | H02J 50/10 |
| 10,958,094 | B2* | 3/2021 | Choi | H04B 5/0037 |
| 2012/0005495 | A1 | 1/2012 | Matsuoka | |
| 2012/0112553 | A1 | 5/2012 | Stoner et al. | |
| 2012/0228529 | A1 | 9/2012 | Trewin et al. | |
| 2014/0078741 | A1 | 3/2014 | Liao et al. | |
| 2016/0181861 | A1 | 6/2016 | Familiant et al. | |

\* cited by examiner

INDUCTIVE POWER TRANSFER

RELATED APPLICATIONS

This application claims priority to U.S. Provisional Patent Application No. 62/815,128, filed Mar. 7, 2019, the entire contents of which are hereby incorporated by reference.

FIELD

The present disclosure relates generally to inductive power transfer between electrical devices.

SUMMARY

Users of electrical devices often prefer such devices without wires to prevent tripping and damage to electrical devices due to inadvertent pulling of power cords during operation or when the electrical devices are moved. Additionally, elimination of wires also simplifies the design of electrical devices. Electrical devices without wires are typically powered by batteries. Batteries, however, have limited run-time and capacity. Mid-power range devices such as office and home appliances consume between approximately 0.1 to 3.2 kilowatts of power. To power these devices using batteries requires very large batteries affecting the portability of the devices. Additionally, batteries must typically be charged regularly, which requires wired chargers and decommissioning of the device while the batteries are being charged.

Additionally, in harsh or hazardous environments, sealed/waterproof electrical devices are needed. In these environments, power cords and exposed power outlets may pose an additional hazard to the environment.

Accordingly, there is a need for wireless mid-range power transfer systems that improve the portability and user accessibility of electrical devices. Additionally, there is a need for wireless mid-range power transfer systems that are sealed and are waterproof.

One embodiment provides a non-contact power transmitter device including a sealed housing provided at least partially within a surface, and a transmitter coil within the sealed housing configured to inductively transfer power to a power receiver device. The power transmitter device also includes a transmitter control unit coupled to the transmitter coil, a transceiver configured to communicate with the power receiver device, and an electronic processor coupled to the transmitter control unit and the transceiver. The electronic processor is configured to establish, using the transceiver, communication with the power receiver device, and negotiate power transfer requirements between the power transmitter device and the power receiver device. The electronic processor is also configured to control the transmitter coil unit to transfer power to the power receiver device.

Another embodiment provides a non-contact power transfer system including a power transmitter device and a power receiver device configured to be coupled in a power transfer relationship with the power transmitter device. The power transmitter device includes a sealed housing provided at least partially within a surface, and a transmitter coil within the sealed housing. The power transmitter device also includes a transmitter control unit coupled to the transmitter coil, a transmitter transceiver, and a transmitter electronic processor coupled to the transmitter control unit and the transceiver. The power receiver device includes a second sealed housing provided at least partially within an electrical appliance, and a receiver coil within the sealed housing. The transmitter coil is configured to inductively transfer power to the receiver coil. The power receiver device also includes a power conversion unit coupled to the receiver coil, a receiver transceiver, and a receiver electronic processor coupled to the power conversion unit and the receiver transceiver.

Another embodiment provides a method for bi-directional non-contact power transfer including establishing communication between a first electrical device and a second electrical device of a bi-directional power transfer system, and determining one of the first electrical device and the second electrical device as a power transmitter and other of the first electrical device and the second electrical device as a power receiver. The method also includes converting input power of the power transmitter to an AC power, and providing the AC power to a transmitter coil of the power transmitter. The method further includes generating, using the transmitter coil, an oscillating magnetic field, and generating an alternating current in a receiver coil of the power receiver based on the oscillating magnetic field. The method also includes converting the alternating current to a direct current, and providing the direct current to a load of the power receiver.

Another embodiment provides a method for non-contact power transfer including establishing communication between a power transmitter device and a power receiver device, and negotiating power transfer requirements between the power transmitter device and the power receiver device. The method also includes providing a first alternating current to a transmitter coil of the power transmitter device, and generating, using the transmitter coil, an oscillating magnetic field. The method further includes generating a second alternating current in a receiver coil of the power receiver device based on the oscillating magnetic field, and converting the second alternating current to output power. The method also includes providing the output power to a load of the power receiver device.

Another embodiment provides a non-contact power transfer system including a power transmitter device and a power receiver device configured to be coupled in a power transfer relationship with the power transmitter device. The power transmitter device includes a flat base portion, and a transmitter coil provided in the flat base portion. The power transmitter device also includes a raised ledge portion around the flat based portion having an opening on an inner side of the raised ledge portion. The power receiver device includes a flat portion, and a raised portion configured to be received in the opening formed by the raised ledge portion of the power transmitter device. The power receiver device includes a receiver coil provided in the raised portion.

In some constructions, a first magnet is provided in the flat base portion in the center of the transmitter coil, and a second magnet is provided in the raised portion in the center of the receiver coil. When the raised portion is received in the opening formed by the raised ledge portion, the first magnet is coupled to the second magnet due to the magnetic force between the first magnet and the second magnet.

Another embodiment provides a method for non-contact power transfer including establishing, using a transceiver of a power transmitter device, communication with a plurality of power receiver devices, and determining, using an electronic processor of the power transmitter device, priority and power requirements of the plurality of power receiver devices. The method also includes dividing, using the electronic processor, the power between a plurality of transmitter coils of the power transmitter device based on the priority and power requirements of the plurality of power receiver devices coupled to the plurality of power transmitter coils.

Another embodiment provides a non-contact power transmitter device including a plurality of transmitter coils configured to inductively transfer power to a plurality of power receiver devices, and a transmitter control unit coupled to the plurality of transmitter coils. The power transmitter device also includes a transceiver configured to communicate with the plurality of power receiver devices, and an electronic processor coupled to the transmitter control unit and the transceiver. The electronic processor is configured to establish, using the transceiver, communication with the plurality of power receiver devices, and determine priority and power requirements of the plurality of power receiver devices based on the communication with the plurality of power receiver devices. The electronic processor is also configured to control the transmitter coil unit to divide the power between the plurality of transmitter coils based on the priority and power requirements.

Another embodiment provides a method for non-contact power transfer including establishing communication between a power transmitter device and a power receiver device, and negotiating power transfer requirements between the power transmitter device and the power receiver device. The method also includes providing a first alternating current to a transmitter coil of the power transmitter device, and generating, using the transmitter coil, an oscillating magnetic field. The method further includes generating a second alternating current in a receiver coil of the power receiver device based on the oscillating magnetic field, and converting the second alternating current to output power. The method also includes providing the output power to a load of the power receiver device. The second alternating current is a single phase alternating current and converting the second alternating current to the output power includes converting the single-phase alternating current to multi-phase alternating current.

Another embodiment provides a method for non-contact power transfer including establishing communication between a power transmitter device and a power receiver device, and negotiating power transfer requirements between the power transmitter device and the power receiver device. The method also includes providing a first alternating current to a transmitter coil of the power transmitter device. The first alternating current is a multi-phase alternating current. The method further includes generating, using the transmitter coil, an oscillating magnetic field, and generating a second alternating current in a receiver coil of the power receiver device based on the oscillating magnetic field. The method also includes converting the second alternating current to output power, and providing the output power to a load of the power receiver device.

Another embodiment provides a method for non-contact power transfer including establishing communication between a power transmitter device and a plurality of power receiver devices, and determining, using an electronic processor of the power transmitter device, priority and power requirements of the plurality of power receiver devices. The method includes dividing, using the electronic processor, a first AC input between a plurality of transmitter coils of the power transmitter device based on the priority and power requirements of the plurality of power receiver devices coupled to the plurality of power transmitter coils. The first AC input is a multi-phase AC input.

Another embodiment provides a method for non-contact power transfer including establishing communication between a power transmitter device and a power receiver device, and negotiating power transfer requirements between the power transmitter device and the power receiver device. The method also includes providing a first alternating current to a transmitter coil of the power transmitter device, and generating, using the transmitter coil, an oscillating magnetic field. The transmitter coil is provided in a transmitter portion of the power transmitter device. The method also includes generating a second alternating current in a receiver coil of the power receiver device based on the oscillating magnetic field. The receiver coil is in a receiver portion of the power receiver device. The method further includes converting the second alternating current to output power, and providing the output power to a load of the power receiver device. The transmitter portion and the receiver portion are aligned to axially align the transmitter coil and the receiver coil without an air gap between the transmitter portion and the receiver portion.

Another embodiment provides a non-contact power transfer system including a power transmitter device and a power receiver device configured to be coupled in a power transfer relationship with the power transmitter device. The power transmitter device includes a flat base portion, and a transmitter coil provided in the flat base portion. The power receiver device includes a flat portion configured to be aligned with the flat base portion of the power transmitter device, and a receiver coil provided in the flat portion. The flat base portion and the flat portion are aligned to axially align the transmitter coil and the receiver coil without an air gap between the flat base portion and the flat portion.

In some constructions, a first magnet is provided in the flat base portion in the center of the transmitter coil, and a second magnet is provided in the flat portion in the center of the receiver coil. When the flat portion is aligned with the flat base portion, the first magnet is coupled to the second magnet due to the magnetic force between the first magnet and the second magnet.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or carried out in various ways.

Figure 1:
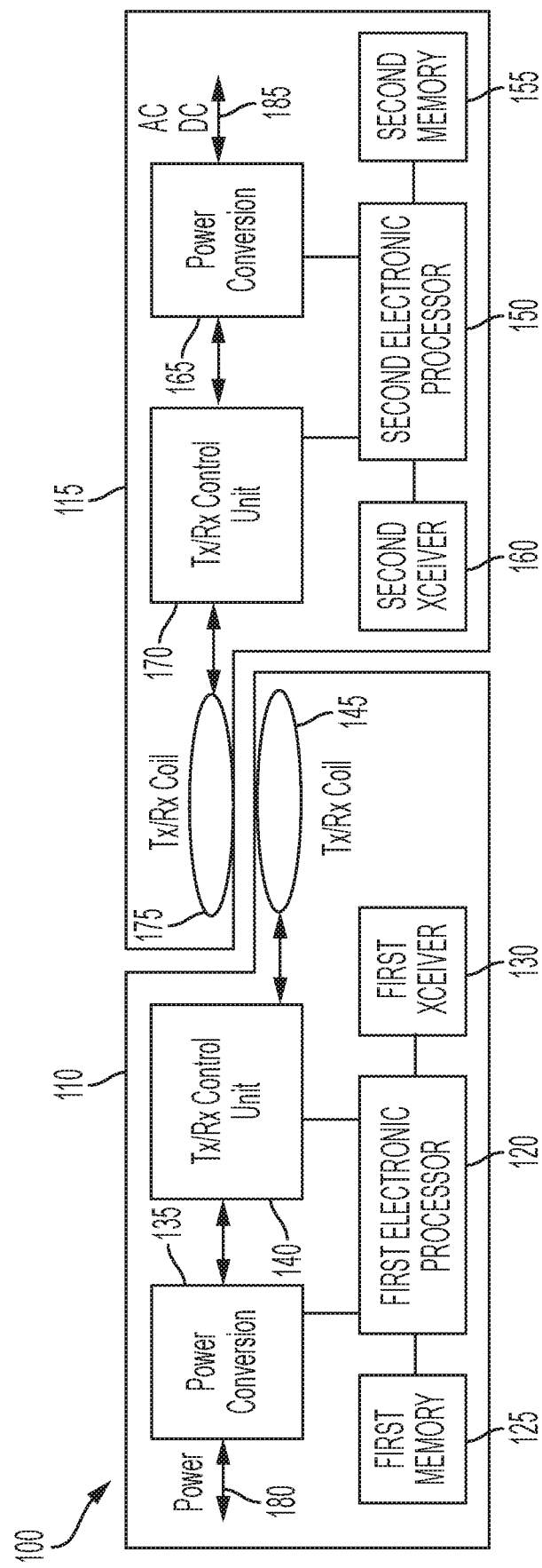
FIG. 1 is a block diagram of a bi-directional non-contact power transfer system in accordance with some embodiments.

FIG. 1 is a block diagram of one embodiment of a bi-directional non-contact separable wiring device power transfer system 100. In the example illustrated, bi-directional non-contact separable wiring device power transfer system 100 is an inductive power transfer system including a first electrical device 110 and a second electrical device 115 in a power transfer relationship with each other. In bi-directional non-contact separable wiring device power transfer system 100 electrical power may be transferred from the first electrical device 110 to the second electrical device 115 or from the second electrical device 115 to the first electrical device 110. First electrical device 110 includes a first electronic processor 120, a first memory 125, a first transceiver 130, a first power conversion circuit 135, a first control unit 140, and a first coil 145. Similarly, the second electrical device 115 includes a second electronic processor 150, a second memory 155, a second transceiver 160, a second power conversion circuit 165, a second control unit 170, and a second coil 175. The first electrical device 110 and the second electrical device 115 may include more or fewer components than those illustrated in FIG. 1 and may perform additional functions to those described herein.

One example of a separable wiring device system is an electrical device pair that can be separated in contrast to, for example, a permanently connected or wired system. For example, a separable wiring device system is a system in which two devices are connected using a plug and receptacle and are, therefore, separable as opposed to connecting the two devices using a wire to wire soldered or bolted connection. In the below embodiments, the separable wiring device system includes two wiring devices that can be separated and the devices may be used with any other compatible transmitter or receiver combinations.

In some embodiments, the first electronic processor 120 is implemented as a microprocessor with separate memory, such as the first memory 125. In other embodiments, the first electronic processor 120 may be implemented as a microcontroller (with the first memory 125 on the same chip). In other embodiments, the first electronic processor 120 may be implemented using multiple processors. In addition, the first electronic processor 120 may be implemented partially or entirely as, for example, a field-programmable gate array (FPGA), an application specific integrated circuit (ASIC), and the like, and the first memory 125 may not be needed or may be modified, accordingly. In the example illustrated, first memory 125 includes non-transitory, computer-readable memory that stores instructions that are received and executed by the first electronic processor 120 to carry out functionality of the first electrical device 110 described herein. First memory 125 may include, for example, a program storage area and a data storage area. The program storage area and the data storage area may include combinations of different types of memory, such as read-only memory and random-access memory. The second electronic processor 150 and the second memory 155 are implemented similar to the first electronic processor 120 and the first memory 125.

The first transceiver 130 and the second transceiver 160 allow for communication between the first electrical device 110 and the second electrical device 115. In some embodiments, the first transceiver 130 and the second transceiver 160 include separate transmitter and receiver components. The first transceiver 130 and the second transceiver 160 enable wireless communication between the first electrical device 110 and the second electrical device 115. For example, the first transceiver 130 and the second transceiver 160 may comprise Bluetooth® modules, near-field communication (NFC) modules, out-of-band communication modules and the like that allow for short range wireless communication between the first electrical device 110 and the second electrical device 115. One skilled in the art would understand that other wireless communication protocols could also be used consistent with the present disclosure.

The functionality of the first power conversion circuit 135, the first control unit 140, the first coil 145, the second power conversion circuit 165, the second control unit 170, the second coil 175 will now be explained with respect to an example where the first electrical device 110 is configured as the power transmitter and the second electrical device 115 is configured as the power receiver. In this example, the first power conversion circuit 135 converts power received from a power input 180 into an alternating current (AC) power. For example, the first power conversion circuit 135 may include an oscillator controlled switching component to convert a direct current (DC) power input to an AC power output. In some embodiments, when the input power is an AC power input, the first power conversion circuit 135 may not be required or may be modified, accordingly, to convert the AC power input to another form, such as AC power having a different frequency, phase, and/or magnitude than the AC input power.

The first control unit 140 is controlled by the first electronic processor 120 to provide the alternating current to the first coil 145. The alternating current through the first coil 145 creates an oscillating magnetic field around the first coil 145. The oscillating magnetic field induces an alternating electromotive force that creates an alternating current in the second coil 175. The second electronic processor 150 controls the second control unit 170 to provide the alternating current from the second coil 175 to the second power conversion circuit 165. In one example, the second power conversion circuit 165 converts the AC power received from the second coil 175 into a DC power at a power output 185. For example, the second power conversion circuit 165 may include a rectifier to convert the AC power from the second coil 175 to a DC power output to a load. In some embodiments, when the load requires an AC power, the second power conversion circuit 165 may not be required or may be modified accordingly.

Figure 2:
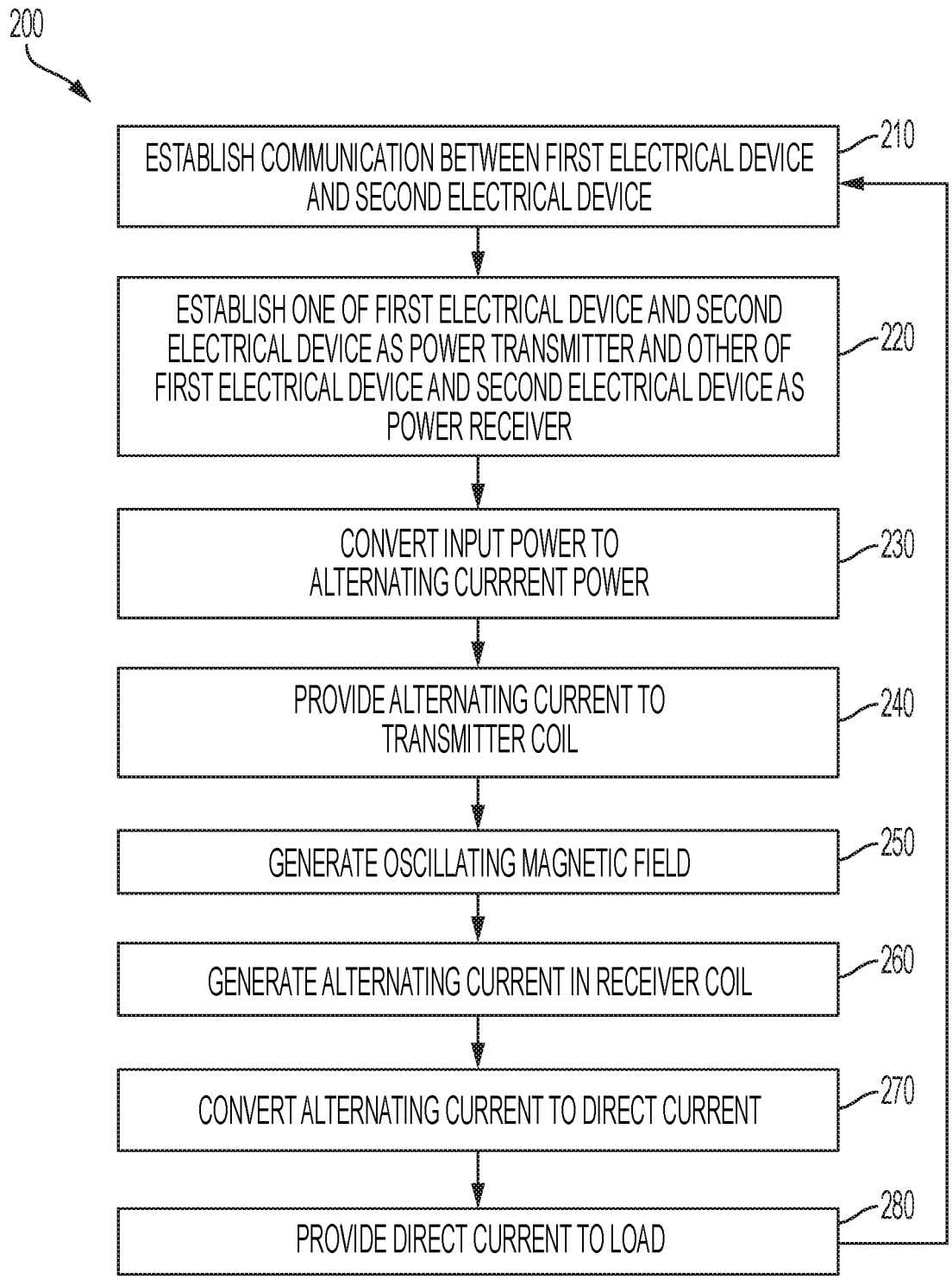
FIG. 2 is a flowchart of a method of operating the bi-directional non-contact separable wiring power transfer system of FIG. 1 in accordance with some embodiments.

FIG. 2 is a flowchart illustrating one exemplary method 200 for operating the bi-directional non-contact separable wiring device power transfer system 100. It should be understood that the order of the steps illustrated in method 200 could vary. Additional steps may also be added to the control sequence and not all of the steps may be required. As illustrated in FIG. 2, method 200 includes establishing communication between the first electrical device 110 and the second electrical device 115 (at block 210). For example, a Bluetooth® connection, a Zigbee® connection, or some other suitable wireless communications method, may be established between the first electrical device 110 and the second electrical device 115 to facilitate communication between the first electronic processor 120 and the second electronic processor 150. The wireless communication between the first electrical device 110 and the second electrical device 115 using Bluetooth®, or other such wireless communication, is referred to herein as "out-of-band communication." In some embodiments, an "in-band communication" based on modulating signals provided to the first coil 145 and the second coil 175 may be established instead of the out-of-band communication. In these embodiments, the first transceiver 130 and the second transceiver 160 may not be required or may be modified accordingly.

The method 200 also includes establishing one of the first electrical device 110 and the second electrical device 115 as the power transmitter and the other of the first electrical device 110 and the second electrical device 115 as the power receiver (at block 220). The first electronic processor 120 and the second electronic processor 150 negotiate over the wireless connection established between the first electrical device 110 and the second electrical device 115. The first electronic processor 120 and/or the second electronic processor 150 determine which one of the first electrical device 110 and the second electrical device 115 is to be the power transmitter and the power receiver. In some embodiments, the first electronic processor 120 and/or the second electronic processor 150 determine the power transmitter and the power receiver based on a user instruction received via a user interface of the first electrical device 110 and/or the second electrical device 115.

The method 200 also includes converting, using a transmitter power conversion circuit, input power to AC power (at block 230). Following the above example, the first power conversion circuit 135 (for example, the transmitter power conversion circuit) converts power received from the power input 180 into an AC power. The method 200 further includes providing, using a transmitter control unit, alternating current to a transmitter coil (at block 240). For example, as described above, the first control unit 140 (for example, the transmitter control unit) provides alternating current from the first power conversion circuit 135 to the first coil 145.

The method 200 also includes generating, using a transmitter coil, an oscillating magnetic field (at block 250). The alternating current flowing through the first coil 145 (for example, the transmitter coil) generates an oscillating magnetic field. The method 200 further includes generating an alternating current in a receiver coil (at block 260). The oscillating magnetic field induces an electromotive force that creates the alternating current in the second coil 175 (for example, the receiver coil).

The method 200 also includes converting, using a receiver power conversion circuit, the alternating current to direct current (at block 270). The second control unit 170 (for example, a receiver control unit) provides the alternating current generated in the second coil 175 to the second power conversion circuit 165 (for example, the receiver power conversion circuit). The second power conversion circuit 165 converts the alternating current to direct current, for example, using a rectifier. The method 200 further includes providing, using the receiver power conversion circuit, the direct current to a load (at block 280). The second power conversion circuit 165 provides the direct current at the power output 185 to a connected load.

Figure 3:
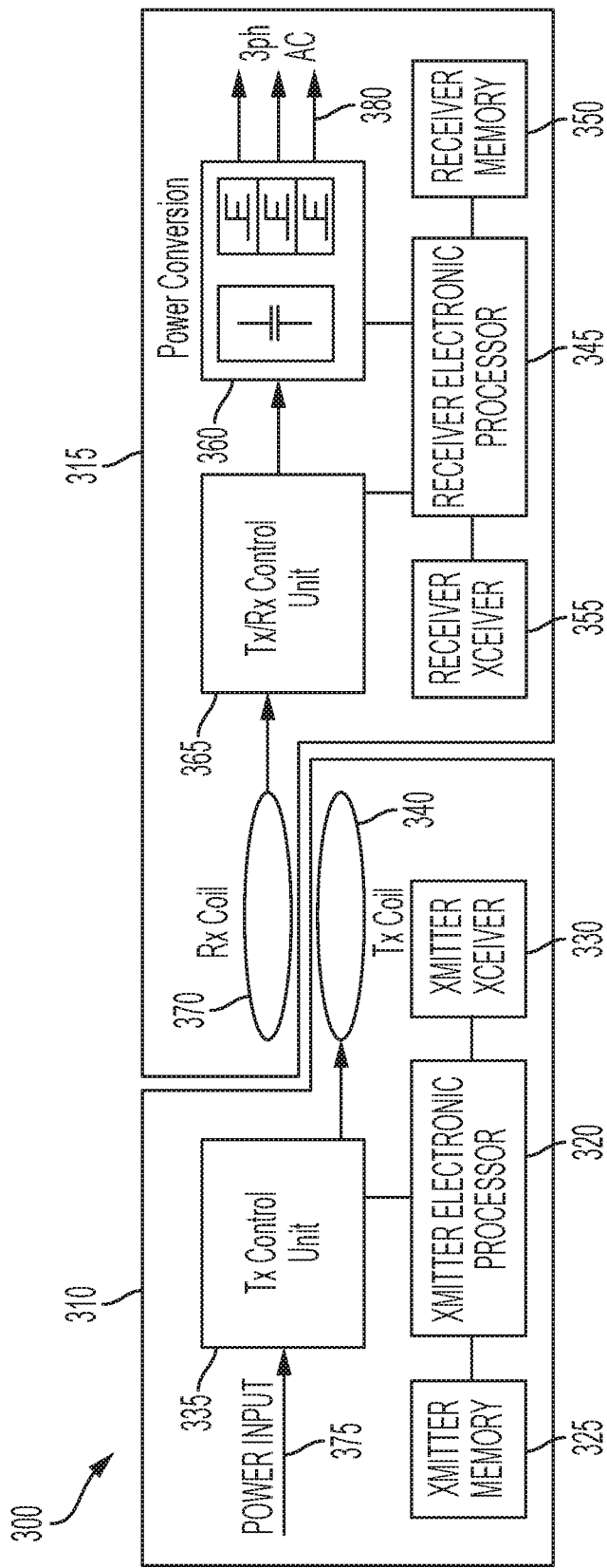
FIG. 3 is a block diagram of a non-contact power transfer system in accordance with some embodiments.

FIG. 3 is a block diagram of one embodiment of a non-contact separable wiring device power transfer system 300. In the example illustrated, the non-contact separable wiring device power transfer system 300 includes a power transmitter device 310 and a power receiver device 315 in a power transfer relationship with each other. In the non-contact separable wiring device power transfer system 300 electrical power is transferred from the power transmitter device 310 to the power receiver device 315. The power transmitter device 310 includes a transmitter electronic processor 320, a transmitter memory 325, a transmitter transceiver 330, a transmitter control unit 335, and a transmitter coil 340. The power receiver device 315 includes a receiver electronic processor 345, a receiver memory 350, a receiver transceiver 355, a receiver power conversion circuit 360, a receiver control unit 365, and a receiver coil 370. The power transmitter device 310 and the power receiver device 315 may include more or fewer components than those illustrated in FIG. 3 and may perform additional functions other than those described herein.

The transmitter electronic processor 320, the transmitter memory 325, the transmitter transceiver 330, the receiver electronic processor 345, the receiver memory 350, and the receiver transceiver 355 are implemented similar to the first electronic processor 120, the first memory 125, and the first transceiver 130 respectively as described above.

The transmitter control unit 335 receives power from a power input 375. The transmitter control unit 335 may include a power conversion circuit, for example, if it is necessary, or otherwise desired, to convert power input 375 to another form, e.g., different frequency, phase, etc. In one example, the power input 375 is a multi-phase AC power input that is converted to a single-phase AC power to be provided to the transmitter control unit 335. In one example, the power input 375 is a direct current (DC) grid, digital electricity source, and the like. The transmitter control unit 335 is controlled by the transmitter electronic processor 320 to provide an alternating current to the transmitter coil 340. The alternating current through the transmitter coil 340 creates an oscillating magnetic field around the transmitter coil 340. The oscillating magnetic field induces an alternating electromotive force that creates an alternating current in the receiver coil 370. The receiver electronic processor 345 controls the receiver control unit 365 to provide the alternating current from the receiver coil 370 to the receiver power conversion circuit 360. Receiver power conversion circuit 360 converts the alternating current in the receiver coil 370 to one of a DC power and other forms of AC power based on the implementation of the non-contact separable wiring device power transfer system 300.

In one example implementation, the receiver power conversion circuit 360 converts the AC power received from the receiver coil 370 into a DC power at a power output 380. For example, although not shown in the exemplary embodiment of FIG. 3, the receiver power conversion circuit 360 may include a rectifier to convert the AC power from the receiver coil 370 to a DC power output to a load. In another example implementation, e.g., the one shown in FIG. 3, the receiver power conversion circuit 360 converts the AC power received from the receiver coil 370 into a three-phase AC power at the power output 380. For example, the receiver power conversion circuit 360 may include one or more transformers to convert the single phase AC power from the receiver coil 370 to a three-phase AC power output to a load. In another example, the receiver power conversion circuit 360 may include an electronic-switch based circuit that alters the input to output characteristics of the AC power.

In accordance with the exemplary embodiment shown, non-contact separable wiring device power transfer system 300 is configured for a power transfer of between 0.1 to 3.2 kiloWatts. In some embodiments, the power transmitter device 310 is configured to transfer between 1 to 100 kiloWatts of power to the power receiver device 315.

Figure 4:
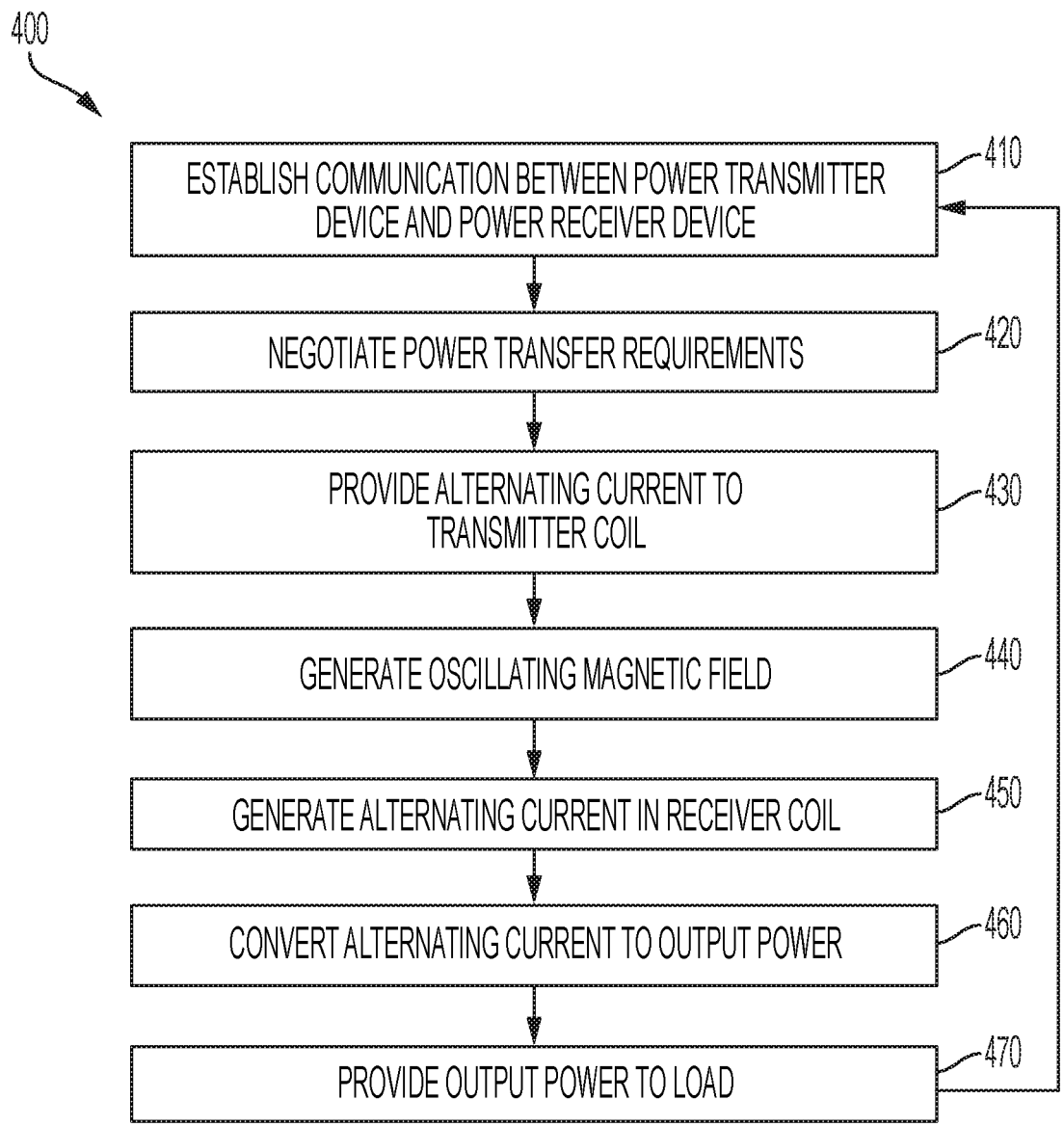
FIG. 4 is a flowchart of a method of operating the non-contact power transfer system of FIG. 3 in accordance with some embodiments.

FIG. 4 is a flowchart illustrating one example method 400 for operating the non-contact separable wiring device power transfer system 300. It should be understood that the order of the steps disclosed in method 400 could vary. Additional steps may also be added to the control sequence and not all of the steps may be required. As illustrated in FIG. 4, the method 400 includes establishing communication between the power transmitter device 310 and the power receiver device 315 (at block 410). For example, a Bluetooth® connection, a Zigbee® connection, or the like may be established between the power transmitter device 310 and the power receiver device 315 to facilitate communication between the transmitter electronic processor 320 and the receiver electronic processor 345. The wireless communication between the power transmitter device 310 and the power receiver device 315 using Bluetooth® and the like is referred to as out-of-band communication. In some embodiments, an in-band communication based on modulating signals provided to the transmitter coil 340 and the receiver coil 370 may be established instead of the out-of-band communication. In these embodiments, the transmitter transceiver 330 and the receiver transceiver 355 may not be required or may be modified accordingly.

The method 400 also includes negotiating power transfer requirements between the power transmitter device 310 and the power receiver device 315 (at block 420). The transmitter electronic processor 320 and the receiver electronic processor 345 negotiate over the wireless connection established between the power transmitter device 310 and the power receiver device 315. The transmitter electronic processor 320 and the receiver electronic processor 345 negotiate to determine the power requirement, for example, the voltage, frequency, and the like for the non-contact power transfer. In one embodiment, the receiver electronic processor 345 communicates the power requirements of the power receiver device 315 to the transmitter electronic processor 320 and the transmitter electronic processor 320 controls the transmitter control unit 335 accordingly.

The method 400 also includes providing, using the transmitter control unit 335, alternating current to the transmitter coil 340 (at block 430). For example, as described above, the transmitter control unit 335 provides alternating current from the power input 375 to the transmitter coil 340. The method 400 further includes generating, using the transmitter coil 340, an oscillating magnetic field (at block 440). The alternating current flowing through the transmitter coil 340 generates an oscillating magnetic field. The method 400 also includes generating an alternating current in the receiver coil 370 (at block 450). The oscillating magnetic field induces an electromotive force that creates the alternating current in the receiver coil 370.

The method 400 also includes converting, using the receiver power conversion circuit 360, the alternating current to a desired output power (at block 460). The receiver control unit 365 provides the alternating current generated in the receiver coil 370 to the receiver power conversion circuit 360. The receiver power conversion circuit 360 converts the alternating current to a direct current, a three-phase alternating current, or the like based on the requirements of the power receiver device 315 as described above. The method 400 further includes providing, using the receiver power conversion circuit 360, the output power to a load (at block 470). The receiver power conversion circuit 360 provides the desired output at the power output 380 to a connected load.

In some embodiments, the non-contact separable wiring device power transfer system 300 is used for metering and monitoring power draw. For example, the power transmitter device 310 includes one or more sensors to detect a current draw, a temperature and the like. The power transmitter device 310 uses the current draw sensor to detect and meter power draw. A power cut-off device may be provided in the power transmitter device 310 to prevent excess power draw from a power receiver device 315. In one example, the power draw is metered such that the power transmitter device 310 cuts off power output after the allotted power draw by a power receiver device 315 has been exceeded.

The power transmitter device 310 may also monitor a temperature and other parameters of the non-contact separable wiring device power transfer system 300. The power transmitter device 310 provides statistic including, for example, temperature, power draw, information about connected loads (e.g., when a device exceeds allotted power), health of the power transmitter device 310, health of the power receiver device 315, and the like to a gateway device or a user device. The gateway device is, for example, a server or other computing device of an entity where the non-contact separable wiring device power transfer system 300 is installed. The user device is, for example, a smartphone application associated with the non-contact separable wiring device power transfer system 300. The transmitter transceiver 330 may communicate wirelessly over a communication network with the gateway device or the user device to provide the statistics. In an embodiment where the power transmitter device 310 is powered by digital electricity, the power transmitter device 310 may further communicate with the digital electricity source to control the power flow.

Figure 5:
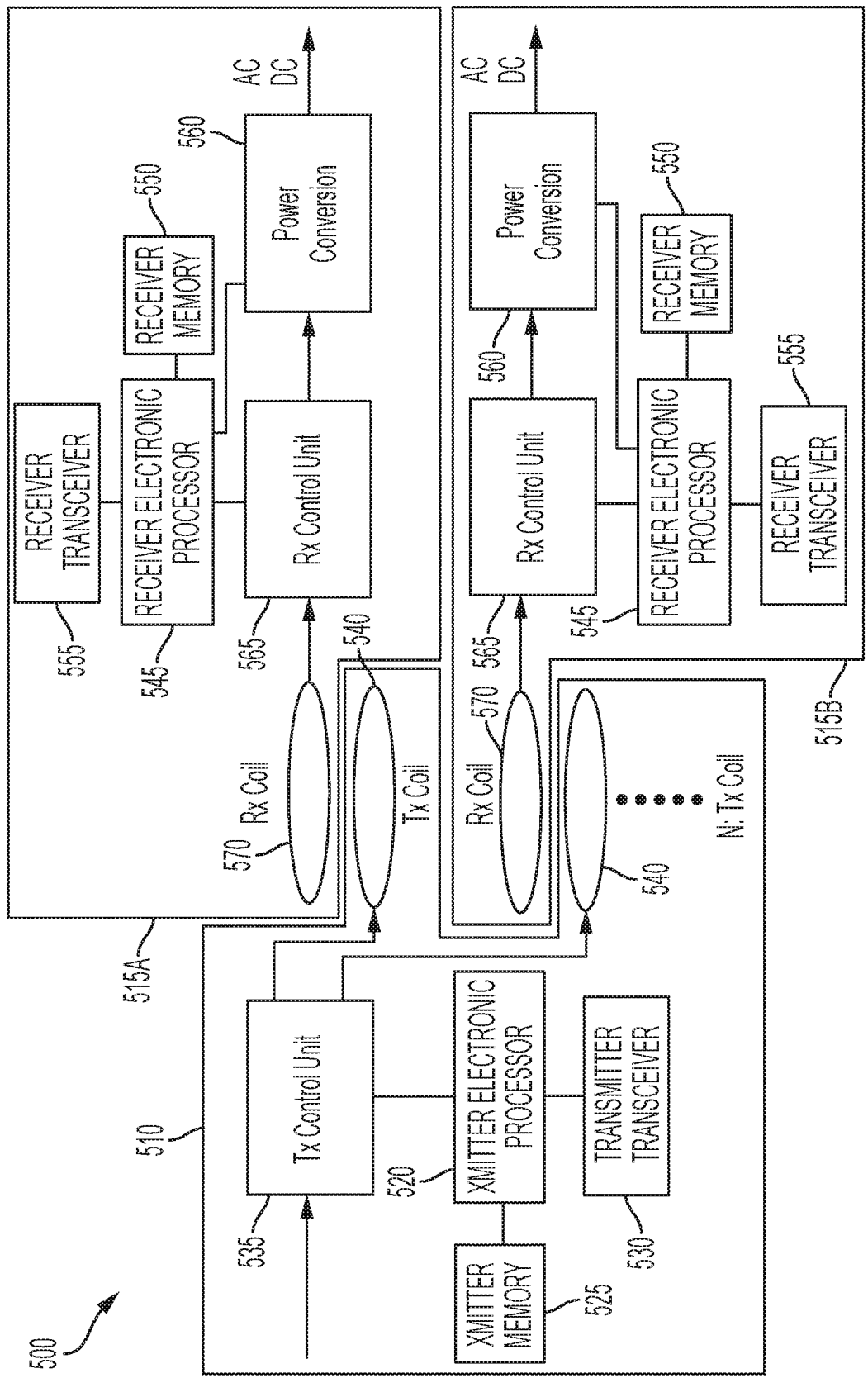
FIG. 5 is a block diagram of a multi-node non-contact power transfer system in accordance with some embodiments.

FIG. 5 is a block diagram of one embodiment of a multi-node non-contact separable wiring device power transfer system 500. In the example illustrated, the multi-node non-contact separable wiring device power transfer system 500 includes a power transmitter device 510 and a plurality of power receiver devices 515. The power transmitter device 510 is in in a power transfer relationship with each of the plurality of power receiver devices 515. In the multi-node non-contact separable wiring device power transfer system 500 electrical power is transferred from the power transmitter device 510 to one or more of the plurality of power receiver device 515. The power transmitter device 510 includes a transmitter electronic processor 520, a transmitter memory 525, a transmitter transceiver 530, a transmitter control unit 535, and a plurality of transmitter coils 540. The plurality of the power receiver devices 515 may be singularly referred to as a power receiver device 515. The plurality of power receiver devices 515 includes a first power receiver device 515A, a second power receiver device 515B, and so on. The power receiver device 515 includes a receiver electronic processor 545, a receiver memory 550, a receiver transceiver 555, a power conversion circuit 560, a receiver control unit 565, and a receiver coil 570. The power transmitter device 510 and the plurality of power receiver device 515 may include more or fewer components than those illustrated in FIG. 5 and may perform additional functions other than those described herein.

The components of the power transmitter device 510 function similarly as the components of the power transmitter device 310 of FIG. 3. However, the power transmitter device 510 divides and distributes the input power to the plurality of transmitter coils 540. The plurality of power receiver devices 515 function similar to the power receiver device 315 of FIG. 3.

Figure 6:
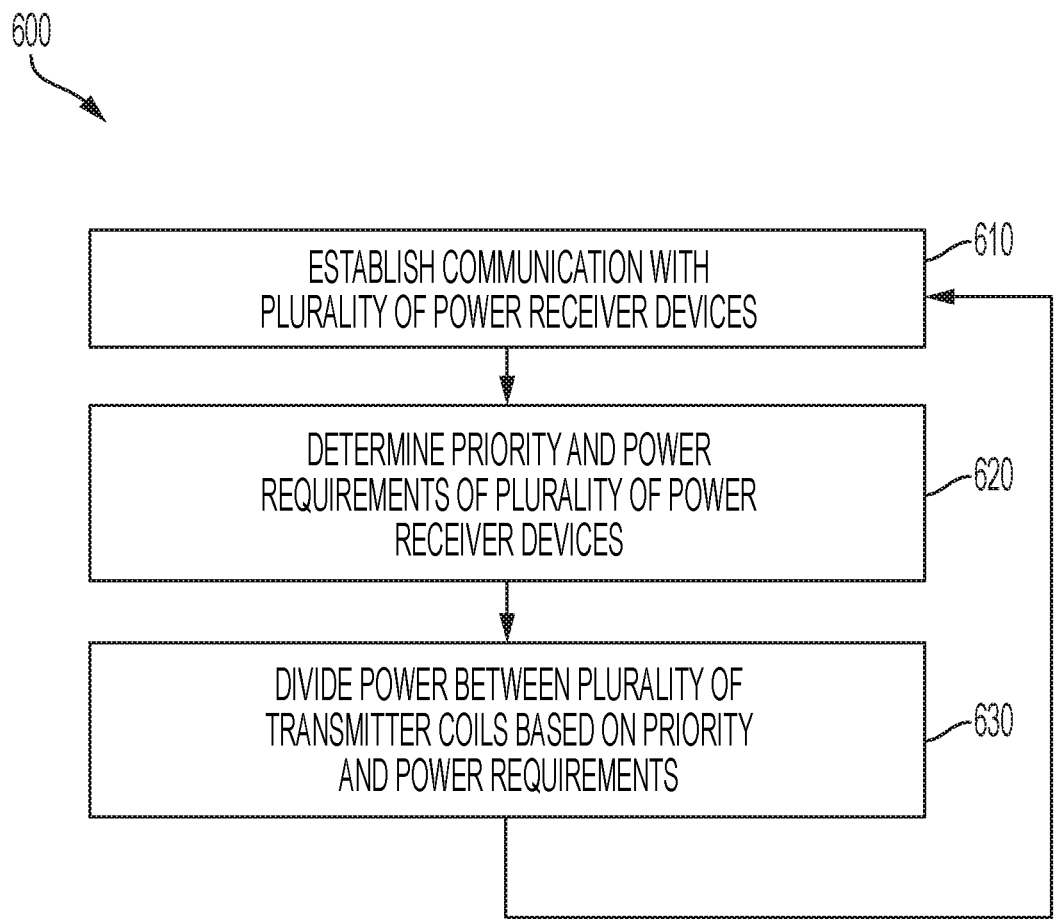
FIG. 6 is a flowchart of a method of operating a power transmitter device of the multi-node non-contact power transfer system of FIG. 5 in accordance with some embodiments.

FIG. 6 is a flowchart illustrating one example method 600 for operating the power transmitter device 510. It should be understood that the order of the steps disclosed in method 600 could vary. Additional steps may also be added to the control sequence and not all of the steps may be required. As illustrated in FIG. 6, the method 600 includes establishing communication, using the transmitter electronic processor 520, with the plurality of power receiver devices 515 (at block 610). As discussed above, the power transmitter device 510 may establish in-band or out-of-band communication with each of the plurality of power receiver devices 515. The method 600 also includes determining, using the transmitter electronic processor 520, a priority and power requirements of the plurality of power receiver devices 515 (at block 620). The transmitter electronic processor 520 communicates with each of the plurality of power receiver devices 515 to negotiate power requirements of the plurality of power receiver devices 515. The transmitter electronic processor 520 may also determine a priority for each of the plurality of power receiver devices 515.

The method 600 also includes dividing, using the transmitter control unit 535, input power between the plurality of transmitter coils 540 based on the priority and power requirements of the plurality of power receiver devices 515 (at block 630). In some embodiments, the transmitter control unit 535 may divide the input power equally between the plurality of transmitter coils 540 irrespective of the power requirements of the plurality of power receiver devices 515. In some embodiments, transmitter control unit 535 may divide the input power between the plurality of transmitter coils 540 in proportion to the power requirements of the plurality of power receiver devices 515.

In some embodiments, the power requirements of one or more of the plurality of power receiver devices 515 may change during operation. The transmitter electronic processor 520 may continuously communicate with the plurality of power receiver devices 515 to update the power requirements of the plurality of power receiver devices 515. The transmitter control unit 535 re-divides the input power between the plurality of transmitter coils 540 based on the updated power requirements of the plurality of power receiver devices 515. In some embodiments, the transmitter control unit 535 may disable a subset of the plurality of transmitter coils 540 in order to address large power requirements of a higher priority power receiver device 515.

Many electrical devices are now used in harsh environments, for example, restaurant kitchens, stadiums, conventions centers, outdoor arenas, golf courses, and the like. These harsh environments originally used gas powered devices that are usually loud and inefficient and produce emissions. These gas powered devices are being replaced by wired electrical devices that are powered from electrical power inputs, for example, power grid, DC grid, digital electricity, and the like. However, wired electrical devices pose their own issues when used in harsh environments where daily cleaning or sanitation is performed. For example, having bare power outlets and power cords may produce a risk of shock to persons in the presence of cleaning solutions. Additionally, the power cords may be a tripping hazard for employees and customers.

The non-contact separable wiring device power transfer system 300 is portable and improves user-accessibility. Additionally, the non-contact separable wiring device power transfer system 300 is provided in sealed and waterproof housings so that the non-contact separable wiring device power transfer system 300 can be used in harsh environments. Specifically, the power transmitter device 310 includes a hermetically sealed housing and may be provided behind walls, in the flooring, in the ground, and the like. In some embodiments, the power transmitter device 310 may be provided on the walls, on the flooring, on the ground, and the like. For example, the sealed housing of the power transmitter device is partially or completely provided within a surface. Similarly, the power receiver device 315 also includes a hermetically sealed housing and may form part of an electrical device or an electrical appliance, for example, a fryer, an electric stove, lights, and the like.

Figure 7A:
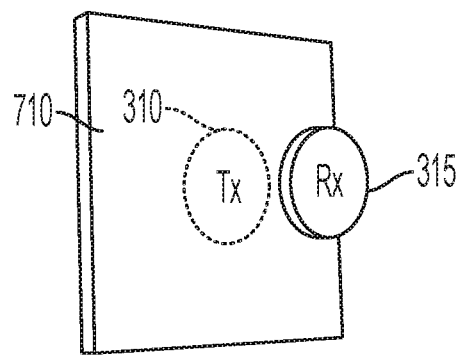
FIGS. 7A-C illustrate an example implementation of the non-contact power transfer system of FIG. 3 implemented in a separable wiring device in accordance with some embodiments.
Figure 7B:
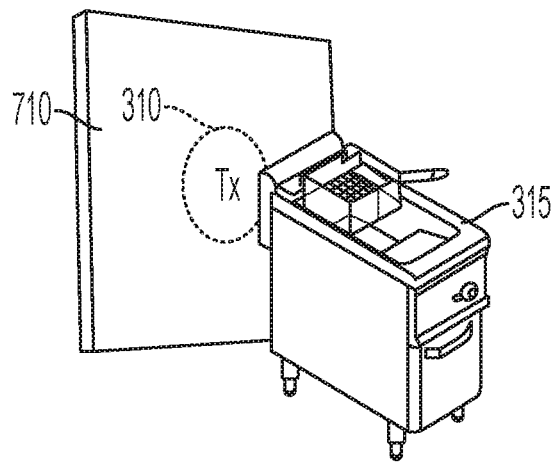
Figure 7C:
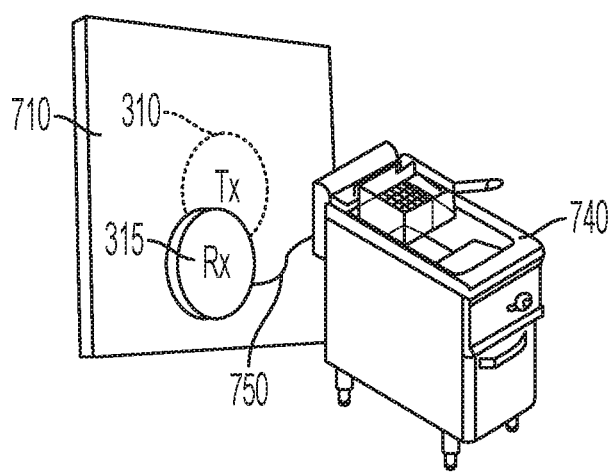

FIGS. 7A-C illustrate an example implementation of the non-contact separable wiring device power transfer system 300. In the example illustrated, the power transmitter device 310 is integrated into a vertical surface 710, for example, a wall surface. Referring to FIG. 7B, the power receiver device 315 is provided within and forms part of an electrical device or appliance 740, for example, a kitchen fryer. Referring to FIG. 7C, the power receiver device 315 is coupled to a the electrical device or appliance 740, for example, a kitchen fryer using a wire. As shown in FIGS. 7B-C, the non-contact separable wiring device power transfer system 300 is provided in, for example, a fast food restaurant. The non-contact separable wiring device power transfer system 300 allows for a kitchen appliance to be moved when, for example, the fast food restaurant is switching from a breakfast to a lunch/dinner menu. Additionally, the non-contact separable wiring device power transfer system 300 allows for easier and safe cleaning of the kitchen area as there are no bare power outlets or wires.

Figure 8A:
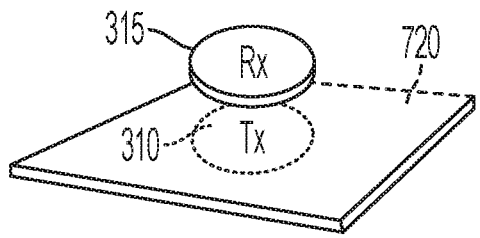
FIGS. 8A-C illustrate an example implementation of the non-contact power transfer system of FIG. 3 implemented in a separable wiring device in accordance with some embodiments.
Figure 8B:
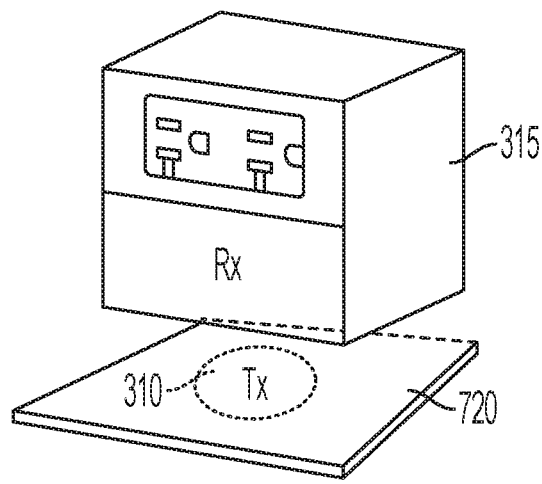
Figure 8C:
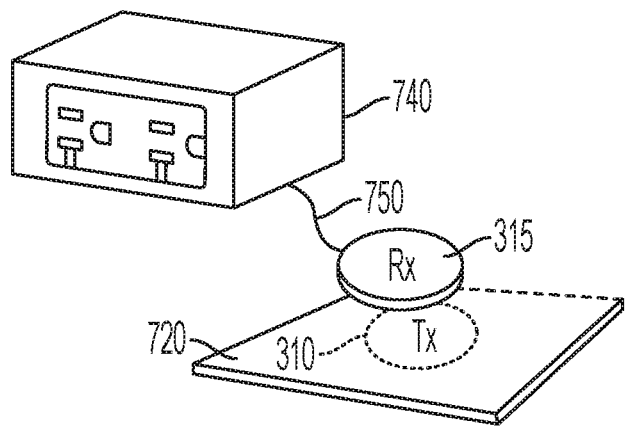

FIGS. 8A-C illustrate an example implementation of the non-contact separable wiring device power transfer system 300. In the example illustrated, the power transmitter device 310 is integrated into a horizontal surface 720, for example, a floor surface, a table surface, the ground (for example, underground), and the like. Referring to FIG. 8B, the power receiver device 315 is provided within and forms part of an electrical device or appliance 740, for example, a floor outlet box. Referring to FIG. 8C, the power receiver device 315 is coupled to the electrical device or appliance 740, for example, a floor outlet box using a wire. As shown in FIGS. 8B-C, the non-contact separable wiring device power transfer system 300 is provided in, for example, a shopping mall, outdoor arena, and the like. The non-contact separable wiring device power transfer system 300 allows for the floor outlet box to be moved when, for example, the floor outlet box is needed at a different location or to be removed when an event is completed. Additionally, the non-contact separable wiring device power transfer system 300 allows for easier and safe cleaning of the shopping mall or outdoor arena as there are no bare power outlets or wires. Since there are no bare outlets provided during cleaning or switching over, any cleaning solution or liquid used during cleaning does not enter the power transmitter device 310 or the power receiver device 315. This allows for the non-contact separable wiring device power transfer system 300 to be used in harsh environments.

Figure 9:
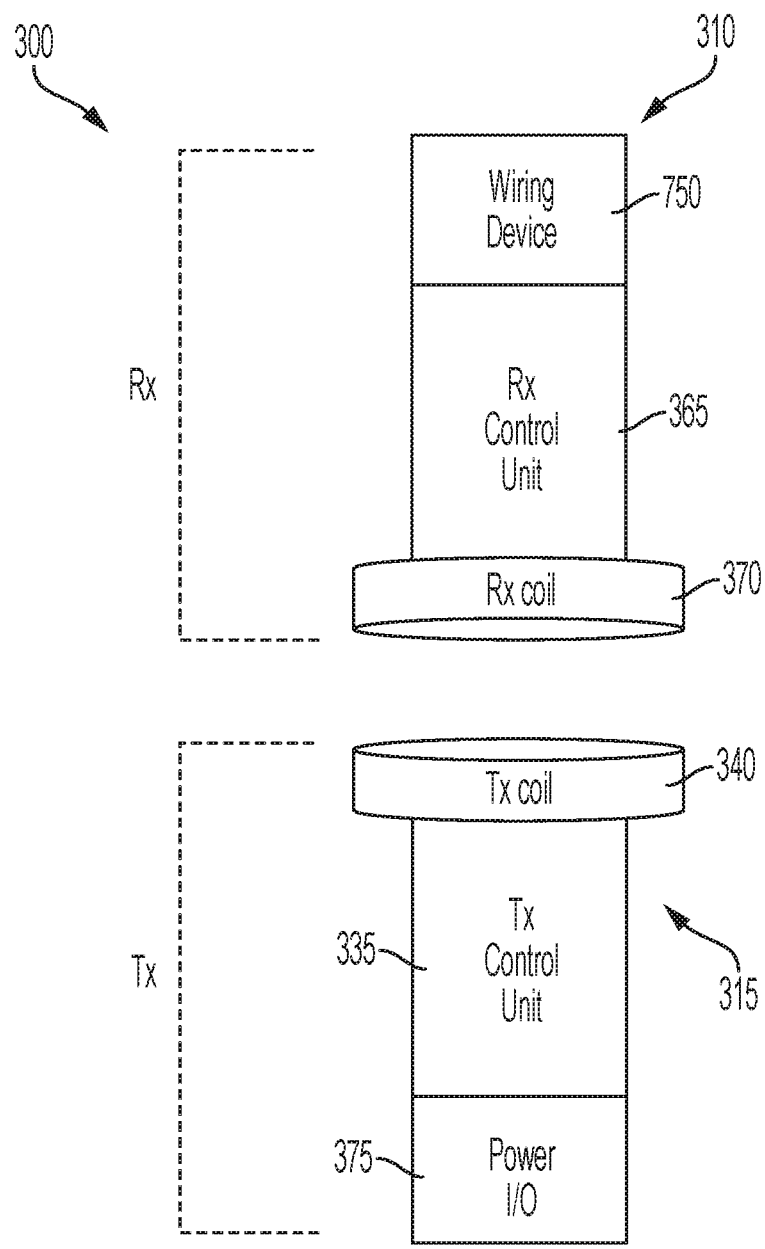
FIG. 9 illustrates an example implementation of the non-contact power transfer system of FIGS. 7C and 8C in accordance with some embodiments.

FIG. 9 illustrates an example configuration of the non-contact separable wiring device power transfer system 300 of FIGS. 7C and 8C. As shown in FIG. 9, the receiver coil 370 is provided beside the transmitter coil 340. The receiver control unit 365 provides the power from the receiver coil 370 to the wiring device 750 to be provided to the load of the power receiver device 315.

Figure 10A:
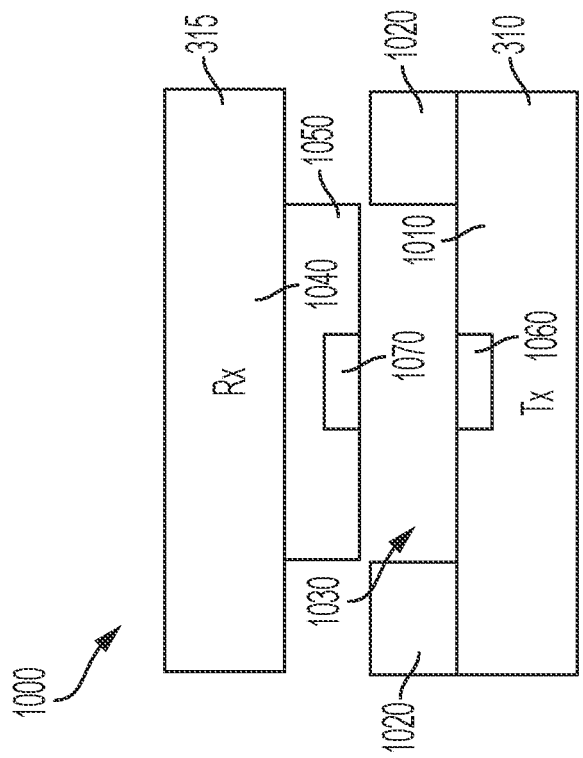
FIG. 10A illustrates an example implementation of the non-contact power transfer system of FIG. 3 implemented in a separable wiring device in accordance with some embodiments.
Figure 10B:
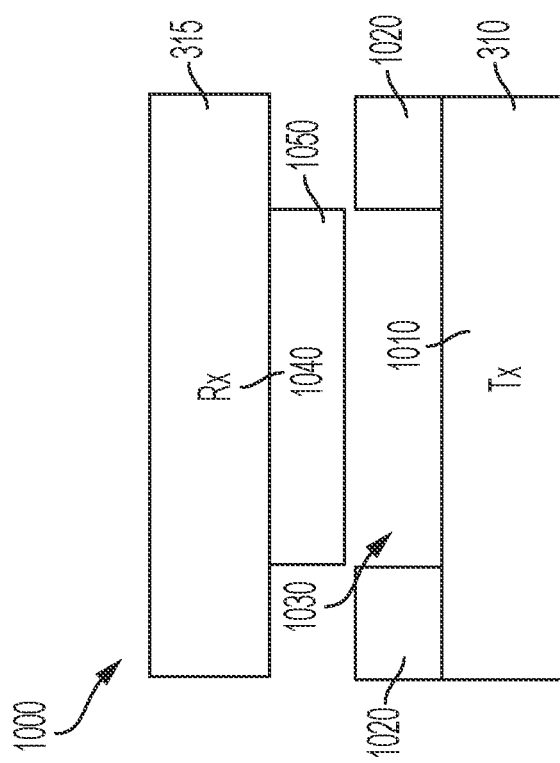
FIG. 10B illustrates an example implementation of the non-contact power transfer system of FIG. 3 implemented in a separable wiring device in accordance with some embodiments.

FIGS. 10A-B illustrate an example coupling 1000 between the power transmitter device 310 and the power receiver device 315. As shown in FIG. 10A, the power transmitter device 310 device includes a flat base portion 1010 (for example, a transmitter portion) and a raised ledge portion 1020 around the flat base portion 1010 with an opening 1030 on an inner side of the raised ledge portion 1020. The raised ledge portion 1020 may be of any shape, for example, a square, a rectangle, a circle, and the like and forms a socket with the opening 1030. The transmitter coil 340 is provided in the flat base portion 1010. The power receiver device 315 includes a flat portion 1040 and a raised portion 1050 (for example, a receiver portion). The raised portion 1050 is of a similar shape as the raised ledge portion 1020 and forms a plug that is received in the socket formed by the raised ledge portion 1020 and the opening 1030. The receiver coil 370 is provided in the raised portion 1050.

In some embodiments, as shown in FIG. 10B, a first magnet 1060 and a second magnet 1070 may be used to couple the power transmitter device 310 and the power receiver device 315. The first magnet 1060 is provided in the flat base portion 1010 of the power transmitter device 310 below the opening 1030. The first magnet 1060 is provided, for example, in the center of the transmitter coil 340 to avoid interference with the magnetic field generated by the transmitter coil 340. The second magnet 1070 is provided in the raised portion 1050 of the power receiver device 315. The second magnet 1070 is similarly provided, for example, in the center of the receiver coil 370 to avoid interference with the magnetic field generated by the transmitter coil 340. One advantage of providing the first magnet 1060 and the second magnet 1070 prevents accidental de-coupling of the power transmitter device 310 and the power receiver device 315, but still prevents any damage to the components when the power transmitter device 310 and the power receiver device 315 are de-coupled due to inadvertent pulling of the devices.

The power transmitter device 310 and the power receiver device 315 may be coupled using the plug and socket configuration shown in FIGS. 10A and 10B. In some embodiments, other coupling configurations may be used to couple the power transmitter device 310 and the power receiver device 315. In the above example, the flat base portion 1010 (that is, the transmitter portion) and the raised portion 1050 (that is, the receiver portion) are aligned to axially align the transmitter coil 340 and the receiver coil 370 (see FIG. 3) without an air gap between the flat base portion 1010 and the raised portion 1050.

Figure 11:
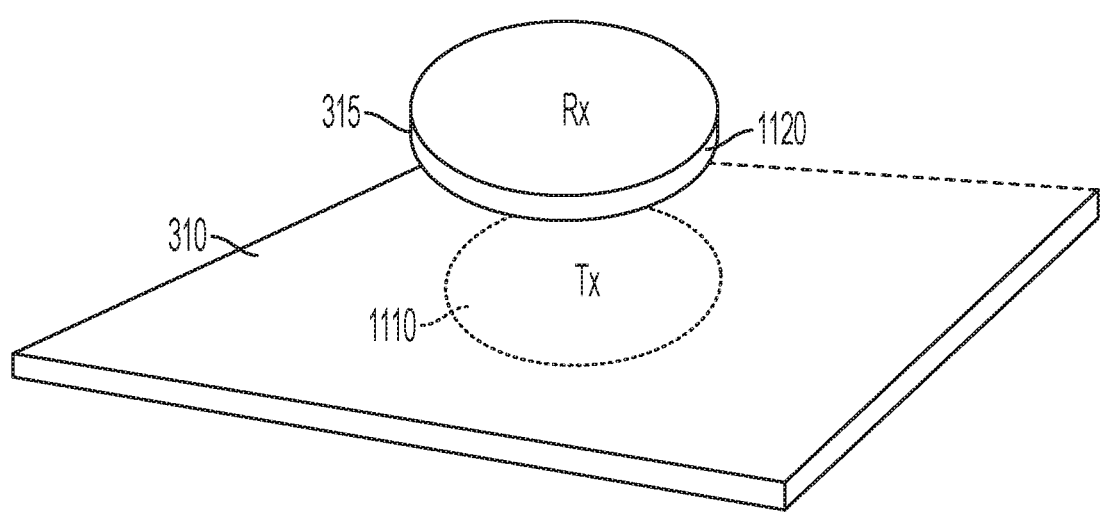
FIG. 11 illustrates an example implementation of the non-contact power transfer system of FIG. 3 in accordance with some embodiments.

In some embodiments, the coupling 1000 between the power transmitter device 310 and the power receiver device 315 may be implemented without the plug and socket configuration illustrated in FIGS. 10A and 10B. For example, as illustrated in FIG. 11, the power transmitter device 310 device includes a flat base portion 1110 (for example, a transmitter portion). The transmitter coil 340 is provided in the flat base portion 1110. The power receiver device 315 includes a flat portion 1120 (for example, a receiver portion). The receiver coil 370 is provided in the flat portion 1120. When the power transmitter device 310 and the power receiver device 315 are coupled, the flat base portion 1110 and the flat portion 1120 are aligned to axially align the transmitter coil 340 and the receiver coil 370 without an air gap between the flat base portion 1110 and the flat portion 1120.

In some embodiments, a first magnet 1060 and a second magnet 1070 (as shown in FIG. 10B) may similarly be used to couple the power transmitter device 310 and the power receiver device 315. The first magnet 1060 is provided in the flat base portion 1110 of the power transmitter device 310, for example, in the center of the transmitter coil 340 to avoid interference with the magnetic field generated by the transmitter coil 340. The second magnet 1070 is provided in the flat portion 1120 of the power receiver device 315, for example, in the center of the receiver coil 370 to avoid interference with the magnetic field generated by the transmitter coil 340.

Thus, the application provides, among other things, inductive power transfer systems.

We claim:

1. A non-contact power transmitter device comprising:
   a sealed housing;
   a transmitter coil within the sealed housing configured to inductively transfer power to a power receiver device;
   a transmitter control unit coupled to the transmitter coil;
   a transceiver configured to communicate with the power receiver device;
   an electronic processor coupled to the transmitter control unit and the transceiver and configured to
      establish, using the transceiver, an out-of-band communication with the power receiver device,
      negotiate power transfer requirements between the power transmitter device and the power receiver device using the out-of-band communication, and
      control the transmitter control unit to transfer power to the power receiver device; and
   a flat base portion, wherein the transmitter coil is provided in the flat base portion, and
   wherein the flat base portion is configured to be aligned with a flat portion of the power receiver device, wherein the receiver coil of the power receiver device is provided in the flat portion, and
   wherein the flat base portion and the flat portion are aligned to axially align the transmitter coil and the receiver coil without an air gap between the flat base portion and the flat portion.

2. The non-contact power transmitter device of claim 1, wherein the transmitter control unit is configured to
   provide a first alternating current to the transmitter coil; and
   generate, using the transmitter coil, an oscillating magnetic field, wherein the oscillating magnetic field generates a second alternating current in a receiver coil of the power receiver device.

3. The non-contact power transmitter device of claim 1, wherein the sealed housing is provided at least partially within the ground.

4. The non-contact power transmitter device of claim 1, further comprising:
   a first magnet provided in the flat base portion, the first magnet provided in a center of the transmitter coil; and
   a second magnet provided in the flat portion, the second magnet provided in a center of the receiver coil, wherein when the flat portion is aligned with the flat base portion, the first magnet is coupled to the second magnet due to the magnetic force between the first magnet and the second magnet.

5. The non-contact power transmitter device of claim 1, further comprising:
a second transmitter coil within the sealed housing configured to inductively transfer power to a second power receiver device;
wherein the electronic processor is further configured to:
establish, using the transceiver, communication with the power receiver device and the second power receiver device,
determine priority and power requirements of the power receiver device and the second power receiver device based on the communication with the power receiver device and the second power receiver device, and
control the transmitter coil unit to divide power between the transmitter coil and the second transmitter coil based on the priority and power requirements.

6. A building comprising:
a surface including the non-contact power transmitter of claim 1, wherein the sealed housing is provided at least partially within the surface.

7. The building of claim 6, herein the surface is one selected from a group consisting of a vertical surface and a horizontal surface.

8. A non-contact power transmitter device comprising:
a sealed housing;
a transmitter coil within the sealed housing configured to inductively transfer power to a power receiver device;
a transmitter control unit coupled to the transmitter coil;
a transceiver configured to communicate with the power receiver device;
an electronic processor coupled to the transmitter control unit and the transceiver and configured to
establish, using the transceiver, an out-of-band communication with the power receiver device,
negotiate power transfer requirements between the power transmitter device and the power receiver device using the out-of-band communication, and
control the transmitter control unit to transfer power to the power receiver device;
a flat base portion, wherein the transmitter coil is provided in the flat base portion; and
a raised ledge portion around the flat base portion having an opening on an inner side of the raised ledge portion,
wherein the raised ledge portion and the flat base portion are configured to receive a raised portion of the power receiver device, and wherein a receiver coil of the power receiver device is provided in the raised portion.

9. The non-contact power transmitter device of claim 8, further comprising:
a first magnet provided in the flat base portion, the first magnet provided in a center of the transmitter coil; and
a second magnet provided in the raised portion, the second magnet provided in a center of the receiver coil,
wherein when the raised portion is received in the opening formed by the raised ledge portion, the first magnet is coupled to the second magnet due to the magnetic force between the first magnet and the second magnet.

10. A non-contact power transfer system comprising:
a power transmitter device including
a sealed housing provided at least partially within a surface,
a transmitter coil within the sealed housing,
a transmitter control unit coupled to the transmitter coil,
a transmitter transceiver, and
a transmitter electronic processor coupled to the transmitter control unit and the transceiver; and
an electrical appliance including a power receiver device configured to be coupled in a power transfer relationship with the power transmitter device, the power receiver device including
a second sealed housing provided at least partially within the electrical appliance,
a receiver coil within the sealed housing, wherein the transmitter coil is configured to inductively transfer power to the receiver coil,
a power conversion unit coupled to the receiver coil,
a receiver transceiver, and
a receiver electronic processor coupled to the power conversion unit and the receiver transceiver,
wherein the transmitter electronic processor is configured to
establish, using the transmitter transceiver, an out-of-band communication with the power receiver device,
negotiate power transfer requirements between the power transmitter device and the power receiver device using the out-of-band communication, and
control the transmitter control unit to transfer power to the power receiver device;
wherein the power receiver device further comprises a raised portion, wherein the receiver coil of the power receiver device is provided in the raised portion, and wherein the power transmitter device further comprises:
a flat base portion, wherein the transmitter coil is provided in the flat base portion; and
a raised ledge portion around the flat base portion having an opening on an inner side of the raised ledge portion,
wherein the raised ledge portion and the flat base portion are configured to receive the raised portion of the power receiver device.

11. The non-contact power transfer system of claim 10, wherein the transmitter coil unit is configured to
provide a first alternating current to the transmitter coil, and
generate, using the transmitter coil, an oscillating magnetic field, wherein the oscillating magnetic field generates a second alternating current in the receiver coil.

12. The non-contact power transfer system of claim 11, wherein the power conversion unit is configured to
convert the second alternating current to a direct current; and
provide the direct current to a load of the power receiver device.

13. The non-contact power transfer system of claim 11, wherein the power conversion unit is configured to
convert the second alternating current to output power; and
provide the output power to a load of the power receiver device.

14. The non-contact power transfer system of claim 13, wherein the second alternating current is a single phase alternating current and wherein converting the second alternating current to the output power includes converting the single-phase alternating current to three-phase alternating current.

15. The non-contact power transfer system of claim 10, wherein the sealed housing is provided at least partially within the ground.

16. The non-contact power transfer system of claim 10, wherein the power transmitter device further comprises a flat base portion, wherein the transmitter coil is provided in the flat base portion, and wherein the power receiver device further comprises a flat portion configured to be aligned with the flat base portion of the power transmitter device, wherein the receiver coil is provided in the flat portion, wherein the flat base portion and the flat portion are aligned to axially align the transmitter coil and the receiver coil without an air gap between the flat base portion and the flat portion.

17. A building comprising:

a surface including at least a portion of the non-contact power transfer system of claim 10, wherein the sealed housing is provided at least partially within the surface.

18. The building of claim 17, wherein the surface is one selected from a group consisting of a vertical surface and a horizontal surface.

\* \* \* \* \*